United States Patent Office 2,726,990
Patented Dec. 13, 1955

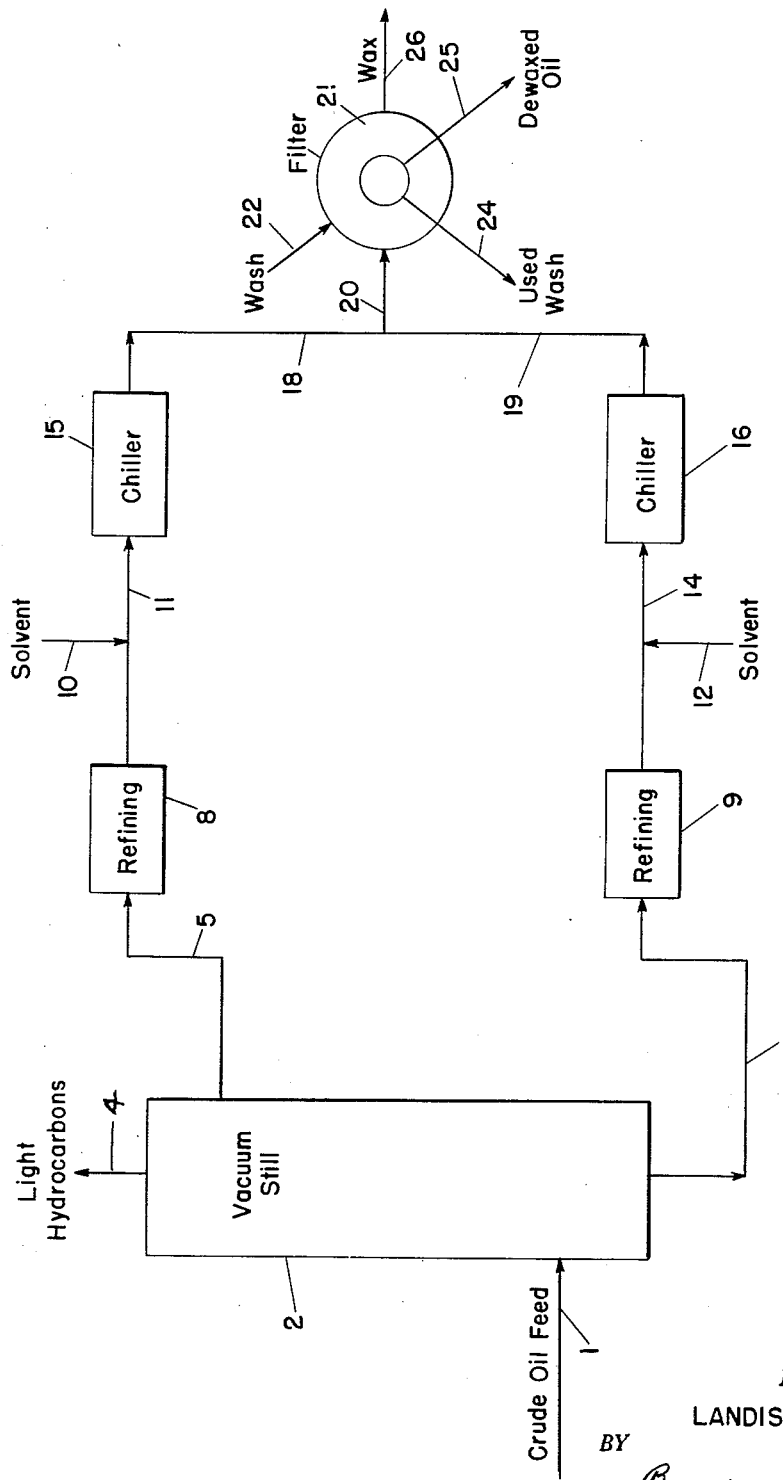
INVENTOR.
LANDIS C. BAKER

2,726,990

SEPARATION OF OIL AND WAX

Landis C. Baker, Swarthmore, Pa., assignor to Sun Oil Company, Philadelphia, Pa., a corporation of New Jersey Application January 2, 1952, Serial No. 264,400

6 Claims. (Cl. 196—19)

This invention relates to the separation of oil and wax, and particularly relates to a process for dewaxing petroleum mineral oils and deoiling petroleum waxes.

The separation of petroleum oils from waxes has heretofore generally been performed by dissolving mixtures of wax and oil, such as wax-bearing oil, in a solvent, chilling the solution to precipitate wax, filtering the precipitated wax, and separating solvent from the oil and wax products. In this process filtration is difficult and slow so that good separation of wax from oil is not obtained. Various materials known as crystal modifiers, such as soaps and polyhydric alcohol esters, have been added before chilling in an attempt to obtain wax crystals in a more filterable form. Such foreign materials, however, frequently exert a deleterious effect upon the oil product and are difficult to separate from the wax product of the dewaxing process. The deoiling of waxes presents similar difficulties, particularly with respect to filtration, so that good separation of oil from wax is not obtained.

An object of the present process is to provide a simple and flexible method for separating wax from oil. Another object is to provide a rapid process for dewaxing oil which does not employ added foreign materials. Other objects will be apparent from the following specification.

It has now been found that by employing a novel sequence of steps for the dewaxing of petroleum oils, or for the deoiling of petroleum waxes, as hereinafter described, wax may be substantially completely separated from oil, filtration rates for the separation of wax from oil are improved, the quantity of solvent required for dewaxing is reduced, and the process is simplified. For simplicity of explanation, the following description is principally directed to the dewaxing of petroleum oils, it being understood that the deoiling of petroleum wax is accomplished in accordance with the process of the present invention by the same sequence of steps.

In accordance with the present process, a petroleum oil is subjected to distillation to prepare a distillate fraction and a residual fraction. Each fraction is separately dissolved in a solvent and the solutions chilled to precipitate wax. The so-formed slurries of precipitated wax in solvent and oil are then admixed and the wax separated from the admixture by filtration. As shown by the following examples, by employing this sequence of steps, the filtration rates for the separation of wax are greatly facilitated, the separation of oil from wax is improved, the quantity of solvent required for dewaxing is reduced and the operation is simplified. The oil and solvent from the filtration step are separated, and the oil subjected to further distillation to produce the desired wax-free fractions. The separated wax may be subjected to further refining operations to produce valuable wax products, and the absence of added foreign materials in the wax, such as crystal modifiers, is a significant advantage of the present process.

Attention is now directed to the accompanying flow diagram which illustrates a preferred embodiment of the present process. Crude oil feed is introduced through line 1 into vacuum still 2. The crude oil may be subjected to a prior distillation (not shown) for removal of light hydrocarbons, such as gasoline, naphtha and gas oil. Light hydrocarbons, or remaining light hydrocarbons, such as gas oil, are removed from still 2 through line 4. A distillate fraction boiling in the lubricating oil range is removed from still 2 through line 5, and a residual stream is removed from still 2 through line 6. It is usually desirable to subject each stream to a refining operation, preferably solvent extraction, to remove aromatics from the distillate stream, and aromatics and asphalt from the residual stream, as indicated by 8 and 9, respectively. After this refining step, a solvent is introduced through line 10 and admixed with the distillate fraction in line 11, the temperature at some stage of admixing being sufficient to obtain dissolution of the distillate fraction in the solvent. Solvent is introduced through line 12 and admixed with the residual fraction in line 14, the temperature at some stage of admixing being sufficient to obtain dissolution of the fraction in the solvent. If necessary, or desirable, a separate vessel may be provided to obtain complete dissolution of each fraction. The solution of the distillate fraction passes from line 11 to chiller 15 wherein wax crystals are precipitated to form a slurry. The solution of the residual fraction passes from line 14 into chiller 16 wherein wax is precipitated to form a slurry. The so-formed slurries pass from chillers 15 and 16 through lines 18 and 19, respectively, are admixed in line 20 and passed to filter 21.

Filtration is advantageously accomplished by means of a rotary vacuum filter having provision for supplying wash liquid to the filtered wax and subsequent drying by suction. Separate continuous take-offs for the washed wax cake, used wash, and filtrate are provided. Wash liquid is applied to the filtered wax cake through line 22; used wash passes out through line 24 and may be recycled preferably after stripping to remove dissolved oil and any wax that may be present. Filtrate is removed through line 25 and passed to a distillation unit (not shown) in order to separate the solvent, which is recycled to the process, from the oil. The wax cake is removed through line 26. Filtration may be accomplished by means other than a rotary vacuum filter, such as by filter pressing, and good results obtained therewith. Valves, pumps, heat exchangers, and the like, the location and operation of which will be apparent to those skilled in the art, have been omitted from the diagram.

The dewaxed oil after separation of solvent is subjected to distillation in order to form the desired fractions.

The solvent employed should have a preferential solvent power for the oil, should dissolve wax at relatively high temperatures, and precipitate wax at relatively low temperatures. A mixture of a wax anti-solvent, such as methyl ethyl ketone, and an oil solvent, such as benzene, gives good results, and a mixture thereof containing approximately equal parts by volume is the preferred solvent, but either of these components may be replaced, in whole or in part, by other materials. For example, other ketones such as methyl butyl ketone or acetone may be substituted for methyl ethyl ketone, and toluene may be substituted for benzene. It is preferred to employ the same solvent for dissolving each fraction from the initial distillation, since recovery of solvent after admixing the slurries and filtering is less difficult than if different solvents are employed. The wash liquid for the wax cake is also preferably the same as the solvent, and should be cooled to approximately the same temperature as the temperature of filtration before applying to the wax cake. In the event that either the distillate or residual slurry, or both, is too thick to obtain easy flow to the filter, additional chilled solvent may be added thereto.

It is not permissible to admix the distillate and residual fractions at any point prior to the chilling operation since on chilling such an admixture, as has been found, the precipitated wax cannot be easily filtered to obtain good separation of wax and oil, and hence such operation defeats the objects of the present invention.

In a preferred method of operating the process of the present invention, two fractions, a distillate fraction and a residual fraction, are prepared by the initial distillation. The distillate fraction usually has a boiling range of from about 650 to 900° F. at atmospheric pressure. The residual fraction usually has a boiling range of above 850° F. at atmospheric pressure. An overlapping of the distillate and residual boiling ranges has no deleterious effects. The process of the present invention may also be employed to dewax oil from two distillate fractions of different boiling range. Such distillate fractions may be successive fractions, such as two fractions having boiling ranges of from 650 to 725° F. and from 725 to 900° F., or fractions not adjacent in boiling range, such as two fractions having boiling ranges of from 600 to 700° F. and from 750 to 900° F. The distillate fractions, or the distillate and residual fractions, will generally be from the same distillation operation, but fractions of different boiling ranges obtained from separate sources may be employed. The process of the present invention may thus be employed to separate wax and oil contained in wax-oil mixtures having different boiling ranges. This is accomplished, as above described, by separately treating each wax-oil mixture as follows: dissolving the mixture in a solvent at a temperature sufficient to obtain dissolution, chilling the solution to produce wax crystals and form a slurry, combining the separately formed slurries and filtering the combined slurries. The filtrate from this operation may be separated into the desired oil products by distillation. In this final distillation, the oil products may be separated at the same temperature and pressure as the initial fractions. The process, however, is not so limited; any desired oil fraction or fractions may be obtained.

The following examples illustrate the process of the present invention:

A commercial lubricating oil refinery was operated as follows, the figures being based on production of 1,000 barrels of oil per day: Crude oil was subjected to a preliminary distillation to remove low boiling hydrocarbons, and then subjected to vacuum distillation to prepare 610 barrels per day of a distillate fraction boiling in the range of from about 700 to 850° F. at atmospheric pressure, and 1,320 barrels per day of a residual fraction boiling above 850° F. Both fractions were refined by solvent extraction to remove aromatics and asphalts. The raffinate from the extraction of the distillate fraction, amounting to 460 barrels per day, was dissolved in 920 barrels per day of solvent at a temperature of about 150° F. The solvent and wash liquid employed throughout the process consisted of a mixture of methyl ethyl ketone and benzene in approximately equal parts by volume. The solution of the distillate fraction was then chilled to about −10° F. to precipitate wax crystals and form a slurry. The so-formed slurry was filtered and washed using a rotary vacuum filter, as above described.

The raffinate from the solvent extraction of the residual fraction, amounting to 870 barrels per day, was dissolved in 3,480 barrels per day of solvent at a temperature of about 180° F. The solution of the residual fraction was then chilled to about −10° F. to precipitate wax crystals and form a slurry. The so-formed slurry was filtered and washed using a rotary vacuum filter as for the distillate slurry. A total of 1,600 barrels per day of wash liquid, applied at a temperature of about −10° F., for both filtrations was used. Solvent was stripped from the filtrate of both filters, and the oil product combined. The oil yield was 75% and amounted to a total of 1,000 barrels per day. The wax product from the filtration contained 30% oil and was subjected to further refining to deoil the wax and prepare wax products.

In the above dewaxing process, it was frequently necessary to operate one filter below capacity in order to maintain proper plant balance.

Using the same crude oil feed and apparatus, the above described process was changed to the extent that, before filtration, the slurries formed by chilling the solutions of the distillate and residual fractions were mixed and both filters used to filter the admixture. By making this change it was found that filtration rates were improved so that the filters could operate at lower speed, thereby decreasing the oil content of the filtered wax, while processing more stock, the operation was simplified and the quantity of solvent required was reduced. Thus, the plant processed 520 barrels per day of the distillate fraction dissolved in 520 barrels per day solvent and 960 barrels per day residual fraction dissolved in 3,480 barrels per day solvent. A total of 1,100 barrels per day of wash liquid was used. The oil yield was 80% and amounted to 1,180 barrels per day. The oil content of the wax product was 15%.

Any mixture of slurries formed from distillate and residuum solutions may be employed, so that the plant is not restricted to the relative capacities of the specific filter employed for each stream.

The process as above described was varied by admixing various quantities of distillate slurry with residual slurry. Good results are obtained when the ratio of distillate slurry to residual slurry is from 1:20 to 20:1 and the advantages of the present invention are obtained at ratios of from 1:40 to 40:1. This ratio may be determined from the quantities of the distillate and residual fractions, or from their raffinates if refined as in the above example, or from the wax contents thereof. For example, using the crude oil of the above example, the aforementioned ratio was varied from 1:3 to 1:1 and excellent results were obtained therewith, the range being determined by practical considerations using the specific plant operated with the specific crude oil.

The foregoing description of the process of the present invention has been directed principally to the dewaxing of petroleum oils. The present process may also be employed where the primary object is to deoil wax to prepare wax products. For example, the wax precipitate obtained as above described, or a slack wax containing a relatively large quantity of oil, say from about 10% to 60%, may be deoiled by subjecting the oily wax to a series of steps as above described. For example, a slack wax containing about 30% oil is subjected to vacuum distillation to prepare a distillate fraction and a residual fraction. The fractions are separately dissolved in a solvent at a temperature sufficient to obtain dissolution. The solvent is advantageously the same as above described for deoiling wax. The solutions are separately chilled to precipitate wax to form wax slurries. The slurries are admixed and the combined slurries filtered. The separated oil-free wax is distilled to produce the desired products.

In this embodiment of the present process, the same advantages as described for dewaxing oil are obtained, namely, an enhanced rate of filtering wax from oil, a decrease in the quantity of solvent and wash liquid required with a corresponding decrease in refrigeration requirements, and improved separation of wax from oil.

Modifications of the process of the present invention will be apparent to those skilled in the art. For example, while it is not permissible to admix the distillate and residual fractions prior to the chilling operation, as above described, admixing may be performed before the chilling operation is complete. It is essential, however, that at least a portion, above about 10%, of the wax present in each fraction be precipitated before admixing. In this embodiment of the process, the solutions of the fractions are separately chilled to precipitate a portion of the wax therein, the so-formed slurries are admixed, and the admixture further chilled to the desired temperature.

The invention claimed is:

1. Method of separating wax from oil which comprises dissolving a mixture of wax and oil in a solvent, chilling the so-formed solution to precipitate at least 10% of the wax present whereby a slurry is formed, dissolving another mixture of wax and oil having a boiling range different from the boiling range of said first mentioned mixture of wax and oil in a solvent, chilling the so-formed solution to precipitate at least 10% of the wax present whereby a slurry is formed, admixing said slurries, filtering said admixed slurries to separate precipitated wax from oil and solvent, and separating oil from solvent.

2. Method of separating wax from oil which comprises distilling a mixture of wax and oil to form at least two fractions having different boiling ranges, separately dissolving said fractions in a solvent therefor, separately chilling the so-formed solutions to precipitate at least 10% of the wax present from each of the solutions whereby slurries are formed, admixing said slurries, and filtering the admixed slurries to separate said precipitated wax.

3. Method of dewaxing petroleum oil which comprises distilling wax-bearing petroleum oil to form a distillate fraction and a residual fraction, separately dissolving said fractions in a solvent, separately chilling the dissolved fractions to precipitate at least 10% of the wax present from each of the dissolved fractions therefrom whereby slurries of said precipitated wax, oil and solvent are formed, admixing said slurries, filtering the admixed slurries to separate said precipitated wax from oil and solvent, and separating oil from solvent.

4. Method according to claim 3 wherein said solvent is a mixture of methyl ethyl ketone and benzene.

5. Method of dewaxing petroleum oil which comprises distilling wax-bearing petroleum oil to form a distillate fraction boiling in the range of from about 700° F. to about 850° F. at atmospheric pressure and a residual fraction boiling above about 850° F. at atmospheric pressure, dissolving said distillate fraction in a solvent, chilling the so-formed solution to a temperature of about −10° F. to precipitate at least 10% of the wax present whereby a slurry is formed, dissolving said residual fraction in a solvent, chilling the so-formed solution to a temperature of about −10° F. to precipitate at least 10% of the wax present whereby a slurry is formed, admixing said slurries, filtering the admixed slurries at a temperature of about −10° F. to separate precipitated wax from oil and solvent, and separating oil from solvent.

6. Method according to claim 5 wherein said solvent is a mixture of methyl ethyl ketone and benzene.

References Cited in the file of this patent

UNITED STATES PATENTS

| | | |
|---|---|---|
| 1,927,057 | Anderson | Sept. 19, 1933 |
| 2,229,658 | Jenkins | Jan. 28, 1941 |
| 2,229,659 | Carr | Jan. 28, 1941 |
| 2,518,365 | Pattillo | Aug. 8, 1950 |
| 2,584,966 | Reeves | Feb. 5, 1952 |